United States Patent
Teshome et al.

(10) Patent No.: US 9,753,517 B2
(45) Date of Patent: Sep. 5, 2017

(54) USER-PERSONALIZED WAKE POLICY BASED ON LEARNED USER BEHAVIOR

(71) Applicants: Abeye Teshome, Austin, TX (US); Claude Lano Cox, Austin, TX (US); Nikhil Manohar Vichare, Austin, TX (US)

(72) Inventors: Abeye Teshome, Austin, TX (US); Claude Lano Cox, Austin, TX (US); Nikhil Manohar Vichare, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 152 days.

(21) Appl. No.: 14/160,148

(22) Filed: Jan. 21, 2014

(65) Prior Publication Data
US 2015/0205335 A1 Jul. 23, 2015

(51) Int. Cl.
*G06F 1/32* (2006.01)
(52) U.S. Cl.
CPC .................................. *G06F 1/3206* (2013.01)
(58) Field of Classification Search
CPC .................................................... G06F 1/3206
See application file for complete search history.

(56) References Cited

U.S. PATENT DOCUMENTS

| 8,041,967 | B2 * | 10/2011 | Belady | G06F 1/3203 713/320 |
| 8,255,090 | B2 * | 8/2012 | Frader-Thompson | G01D 4/002 700/295 |
| 8,655,307 | B1 * | 2/2014 | Walker | H04W 52/0212 455/343.5 |
| 8,849,097 | B2 * | 9/2014 | Klappert | H04N 7/163 386/291 |
| 2010/0115309 | A1 * | 5/2010 | Carvalho | G06F 1/32 713/320 |

OTHER PUBLICATIONS

"7 Facts About Intel's Smart Connect in the Dell XPS 13," by Eric Grevstad at pcmag.com (http://www.pcmag.com/article2/0,2817,2401223,00.asp. 2 pages, Mar. 6, 2012.

* cited by examiner

*Primary Examiner* — Kim Huynh
*Assistant Examiner* — Eric Chang
(74) *Attorney, Agent, or Firm* — Baker Botts L.L.P.

(57) ABSTRACT

Methods and systems for implementing a user-personalized wake policy may enable learning of actual user behavior over daily, weekly, and/or monthly time scales. Based on actual usage patterns of a user of an information handling system, the user-personalized wake policy may automatically wake the information handling system in advance of when the user is predicted to desire to use the information handling system. Other actions, such as network data updates, may be automatically performed by the user-personalized wake policy in advance of the user-personalized wake times.

17 Claims, 3 Drawing Sheets

USER-PERSONALIZED WAKE POLICY BASED ON LEARNED USER BEHAVIOR

BACKGROUND

Field of the Disclosure

This disclosure relates generally to information handling systems and more particularly to a user-personalized wake policy for information handling systems based on learned user behavior.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain information handling systems, such as portable information handling systems having a battery for operation independent of line power, certain functionality for power management may provide certain dormant power states, including a sleep mode that reduces power consumption but still enables a relatively rapid wake up as compared to a cold power up, and is accordingly more convenient for users than a power off state. Advancements in power management technology have enabled additional background functionality, such as associated with user-specific network connectivity, to be maintained even when dormant power states are used, including sleep mode and power off states. For example, certain conventional power management technology may provide user-selectable and default wake timers to wake the information handling system from sleep mode periodically for data updates (i.e., for email, social media updates, system updates, scheduled downloads, etc.), while the wake timers are based on either fixed intervals (e.g., every 15 minutes) or fixed clock times. However, wake timers based on fixed intervals and/or fixed clock times may not be well suited for actual usage patterns that users of information handling systems experience.

SUMMARY

In one aspect, a disclosed method includes recording, for a user during a first duration, first usage parameters indicating first periods of usage activity and second periods of inactivity associated with an information handling system. Based at least in part on the first usage parameters for the user recorded during the first duration, the method may include generating a wake policy for the information handling system, the wake policy specifying user-personalized wake times for waking the information handling system from a dormant power state. The method may also include executing the wake policy, including waking the information handling system at the user-personalized wake times.

Other disclosed aspects include article of manufacture comprising a non-transitory computer-readable medium storing instructions executable by a processor, and the information handling system.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

Figure 1:
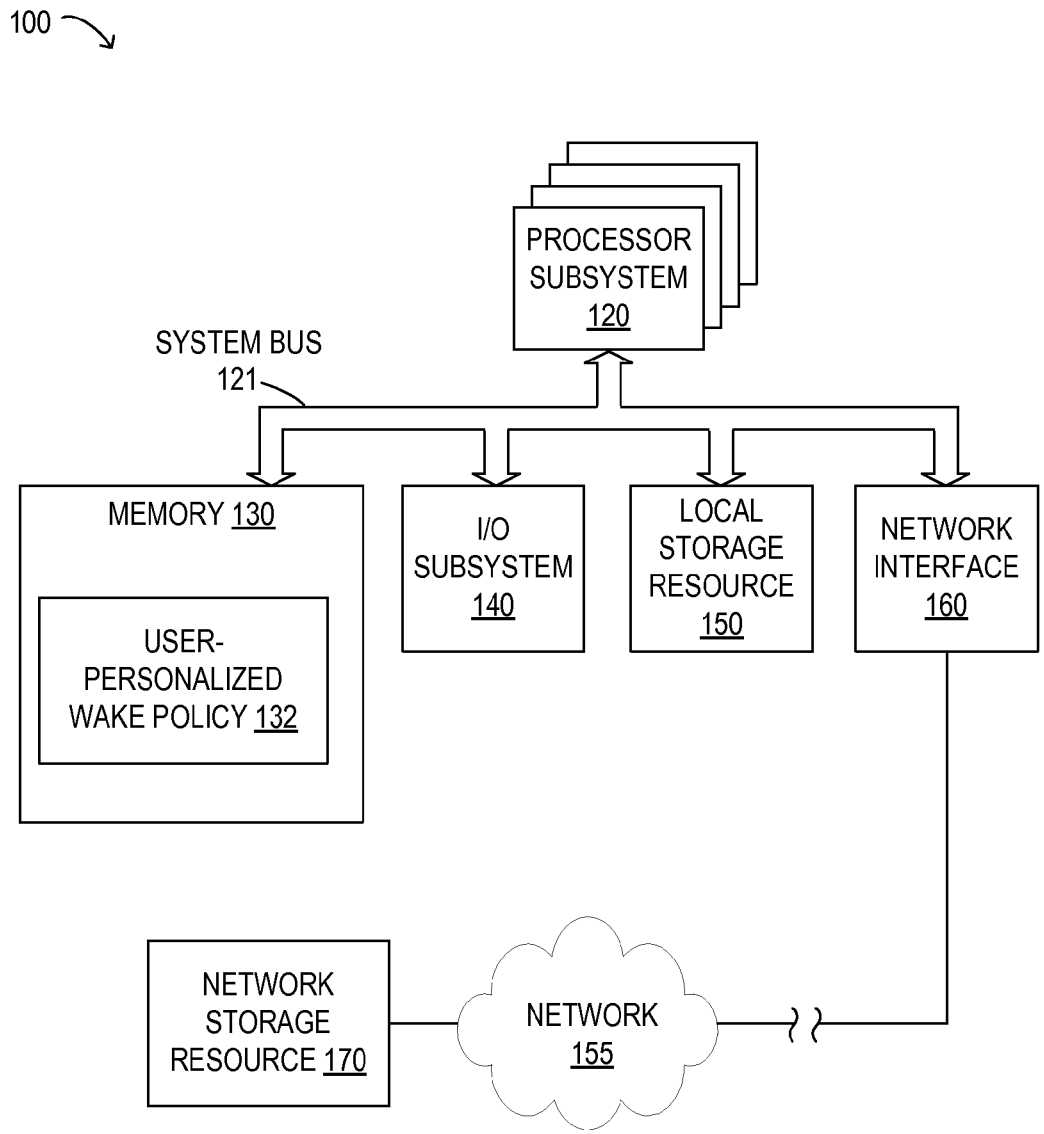
FIG. 1 is a block diagram of selected elements of an embodiment of an information handling system for implementing a user-personalized wake policy.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

As noted previously, conventional wake timers in an information handling system may provide user-selectable and/or default wake timers to wake the information handling system from a dormant power state periodically. The dormant power state may include a sleep mode and/or a power off state. However, such conventional wake timers, which are based on fixed intervals and/or clock times, may not be well suited to accommodate actual usage patterns of individual users. Actual usage patterns of real life users may include daily, weekly, seasonal, and/or other periodic or irregular activities.

As will be described in further detail, the inventors of the present disclosure have discovered that a user-personalized wake policy based on learned user behavior may provide certain advantages over conventional wake timers. The user-personalized wake policy of the present disclosure may be adaptive to actual user activity and may account for variations in user usage patterns over the short term (e.g., within about daily and/or weekly cycles) as well as over the long term (e.g., within about monthly, quarterly, seasonal, academic, and/or other longer cycles). In this manner, the user-personalized wake policy described herein may be advantageous both in terms of reducing actual power consumption of the information handling system, as well as providing additional user benefit by waking the information handling system before a user normally begins using the information handling system to perform data updates and/or other background actions, thereby saving the user time and effort to manually perform data updates.

Figure 2:
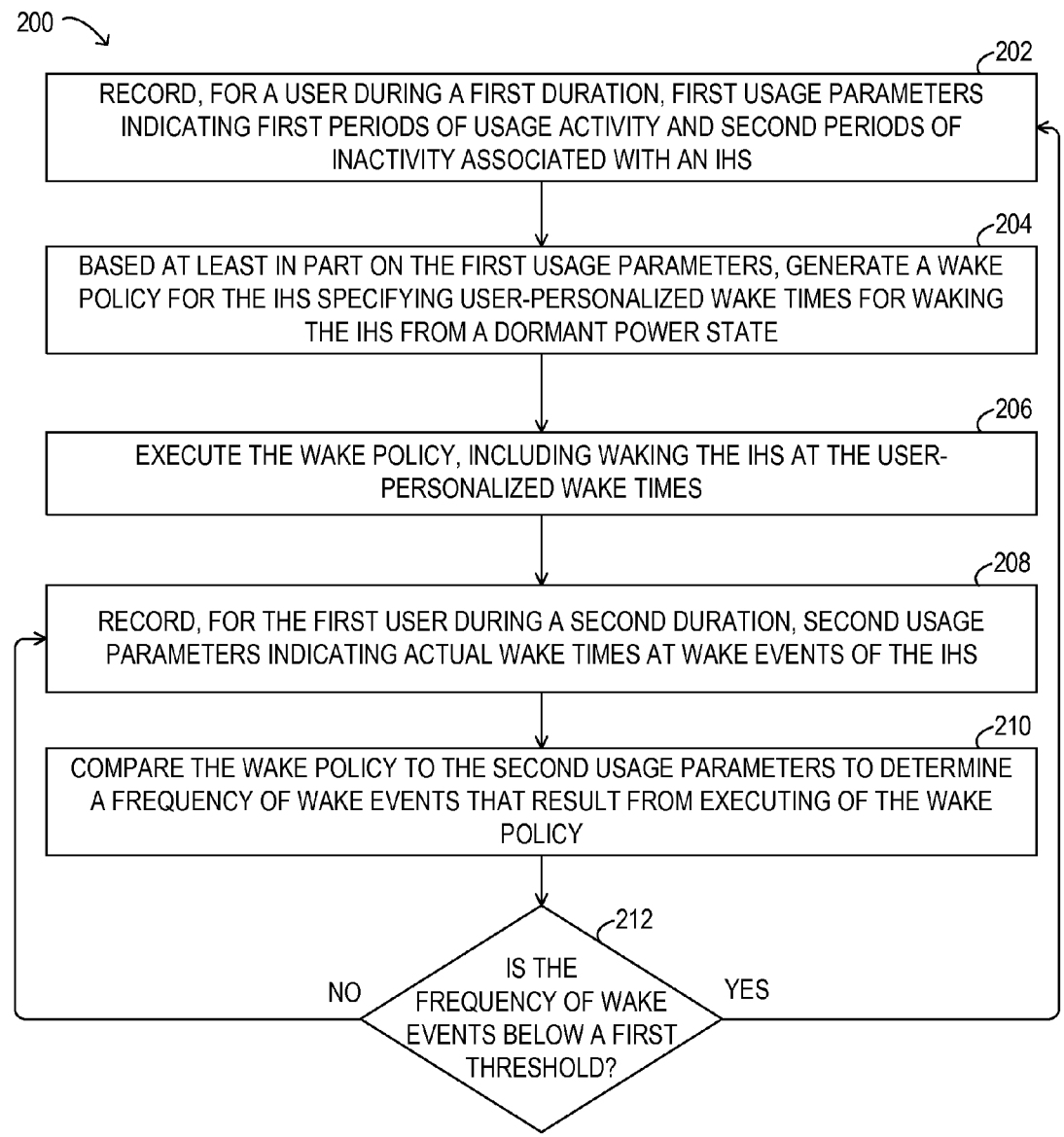
FIG. 2 is a flowchart depicting selected elements of an embodiment of a method for implementing a user-personalized wake policy.
Figure 3:
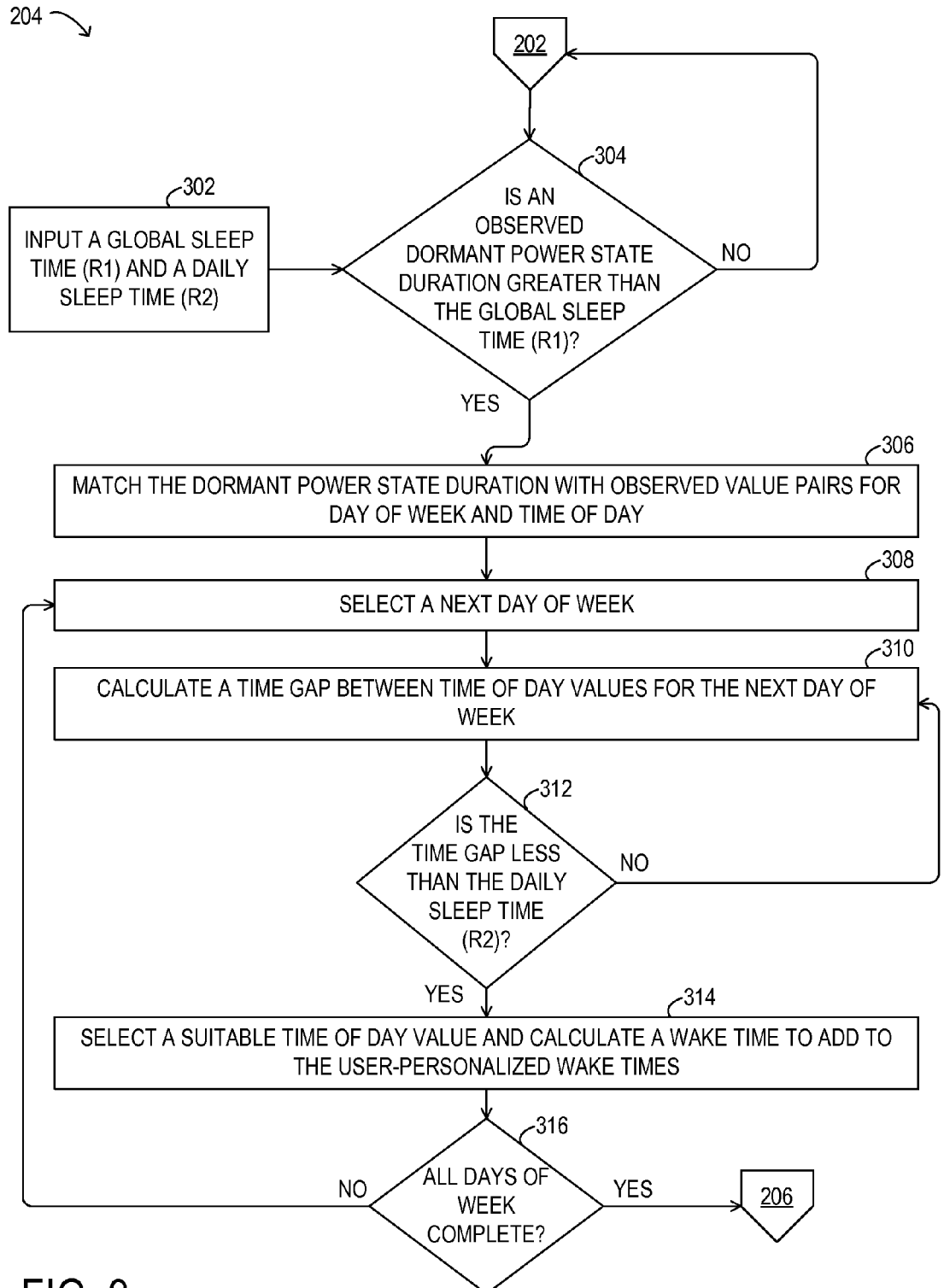
FIG. 3 is a flowchart depicting selected elements of an embodiment of a method for implementing a user-personalized wake policy.

Particular embodiments are best understood by reference to FIGS. 1, 2, and 3 wherein like numbers are used to indicate like and corresponding parts.

Turning now to the drawings, FIG. 1 illustrates a block diagram depicting selected elements of an embodiment of information handling system 100. Also shown with information handling system 100 are external or remote elements, namely, network 155 and network storage resource 170.

As shown in FIG. 1, components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, and network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 may be a suitable system, apparatus, or device operable to serve as an interface between information handling system 100 and a network 155. Network interface 160 may enable information handling system 100 to communicate over network 155 using a suitable transmission protocol and/or standard, including, but not limited to, transmission protocols and/or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 155 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof. In certain embodiments, system 100 and network 155 may be included in a rack domain.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of physical hardware 102). In the same or alternative embodiments, processor subsystem 120 may interpret and/or execute program instructions and/or process data stored remotely (e.g., in a network storage resource).

Also in FIG. 1, memory subsystem 130 may comprise a system, device, or apparatus operable to retain and/or retrieve program instructions and/or data for a period of time (e.g., computer-readable media). As shown in the example embodiment of FIG. 1, memory subsystem 130 stores user-personalized wake policy 132, which may represent instructions executable by processor subsystem 120 to implement the methods described herein. It is noted that in different embodiments, user-personalized wake policy 132 may be stored at network storage resource 170 and may be accessed by processor subsystem 120 via network 155 Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory subsystem 130 for execution, such as user-personalized wake policy 132. In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In certain embodiments, I/O subsystem 140 may comprise a touch panel and/or a display adapter. The touch panel (not shown) may include circuitry for enabling touch functionality in conjunction with a display (not shown) that is driven by display adapter (not shown). As will be described in further detail, information handling system 100 may implement a user-personalized wake policy based on learned user behavior.

Turning now to FIG. 2, a block diagram of selected elements of an embodiment of method 200 for implementing a user-personalized wake policy is depicted in flowchart form. Method 200 may be performed using information handling system 100 (see FIG. 1) for example, by executing user-personalized wake policy 132. It is noted that certain operations described in method 200 may be optional or may be rearranged in different embodiments.

Method 200 may begin by recording (operation 202), for a user during a first duration, first usage parameters indicating first periods of usage activity and second periods of inactivity associated with an information handling system (IHS). The first duration may represent a learning period for the user-personalized wake policy during which the personalized preferences and behaviors of the user are learned by the user-personalized wake policy. The first periods of usage activity may represent usage sessions during which the user continuously uses the information handling system, while the second periods of inactivity may represent dormant activity between the first periods. In certain instances, the second periods of inactivity may be associated with a dormant power state in which the information handling system is placed in order to preserve power. One example of a dormant power state is "sleep mode" or "standby mode", in which the information handling system remains booted and ready to resume operation within a short wake time. In some cases, the dormant power state is associated with disabling of certain components of the information handling system, such as a display device, a storage device, a network adapter, among other components. When the dormant power state is a power off state, the wake policy may automatically start (i.e., boot) the information handling system in advance of a wake time. As noted, during the first duration, the user-personalized wake policy may monitor and record start and stop times (or other related time values, such as time periods, gaps, etc.) to learn the user's actual usage patterns of activity on the information handling system. In certain embodiments, the first duration may last for at least three weeks, for example, when a weekly pattern for the user-personalized wake policy is to be learned. In various embodiments, the first duration may be extended and/or repeated to accommodate changes in the user's actual usage patterns. As will be described in further detail, the user-personalized wake policy may further include a month of year, in addition to day of week and time of day, to specify user-personalized wake times that include longer term variations in a user's actual usage patterns, such as monthly, quarterly, seasonally, etc. Based at least in part on the first usage parameters, a wake policy for the information handling system may be generated (operation 204) specifying user-personalized wake times for waking the information handling system from a dormant power state. The wake policy implemented with the user-personalized wake times is referred to herein as the user-personalized wake policy. The wake policy may further include performing other actions at the user-personalized wake times, such as performing data updates in advance of when the user is expected to begin an instance of a first period of usage activity, so that the information handling system is updated and ready to use for the user. The wake policy may be executed (operation 206) including waking the information handling system at the user-personalized wake time. As noted, in certain embodiments, executing the wake policy may include waking the information handling system in advance of the user-personalized wake time and preparing the information handling system for use by performing desired data updates and/or other functions, including network activity (data transfers over the network) and/or local activity (installations and/or maintenance on the information handling system). The network activity may include updating email accounts, updating social media accounts, downloading updates, scheduled network operations, and/or performing scheduled tasks from a network server (i.e., scanning for malicious code, updating malicious code signatures, downloading/installing software updates, etc.). The local activity may include executing programs, performing security scans, repairing file systems, running diagnostic tests, and/or other types of desired local maintenance. The advance time may be used by the wake policy for performing other system management activities, such as performing a hardware/software inventory of the information handling system, software updates, compliance checks etc. System management and/or maintenance activities may be performed by the wake policy using a network to connect to a network server over a public network (i.e., cloud-based services) or over a local-area network (i.e., local network administrator services). It is noted that network activity and local activity may be combined or performed in conjunction with one another with respect to system management and/or maintenance activities performed by the wake policy.

Then, in method 200, second usage parameters, for the user during a second duration, may be recorded (operation 208) indicating actual wake times at wake events of the information handling system. Operation 208 may be performed as a monitoring operation while the wake policy is being executed on the information handling system, and may be repeated, as desired. In other words, the second duration may be selected to be independent of the first duration and may be periodically repeated. The actual wake times indicated by the second usage parameters may be associated with wake events that are automatically executed by the wake policy, rather than wake events manually performed by the user, which are recorded with the first usage parameters. It is noted that when a wake policy wake event occurs, it may be understood as evidence that the wake policy was successful to the extent that the user did not manually wake the information handling system prior to that wake event. When the user manually wakes the information handling system, the wake policy may be understood to have failed for that particular wake event in learning the user's desired behavior, since the wake policy did not wake the information handling system in advance of when the user desired to begin a first period of usage activity. The wake policy may be compared (operation 210) to the second usage parameters to determine a frequency of wake events that result from executing of the wake policy. The frequency of wake events determined in operation 210 may be expressed at a hit ratio over a period of time, or as a relative value to a total number of wake events, including manual and automatic wake policy events. Then, a decision may be made whether the frequency of wake events is below a first threshold (operation 212). The first threshold may be a quantitative measure of a desired efficacy of the wake policy, such as 90% of all wake events, for example. When the result of operation 212 is YES, method 200 may return to operation 202 where additional first usage parameters may be recorded (i.e., additional learning for the user-personalized wake policy). When the result of operation 212 is NO, method 200 may return to operation 208. In this manner, method 200 may continue to learn and adapt to the user's actual usage behavior over time.

It is noted that method 200 may incorporate certain data structures that enable the user-personalized wake policy to learn and adapt to changes in the user's usage patterns over different time scales. For example, for an initial time respectively associated with the first periods of usage activity, the first usage parameters may include a time of day, a day of week, and a month of year. The second usage parameters may also include a time of day, a day of week, and a month of year. In this manner, a daily or weekly pattern may be captured and implemented by the user-personalized wake policy. However, the daily or weekly pattern may further be adapted to monthly variations, such as seasonal variations that result from varying sleep and/or daylight patterns, academic and summer schedules, vacations, etc. While the first duration may initially be about three weeks to learn a basic daily or weekly usage activity pattern for a user, over longer periods of time as the first usage parameters continue to be collected, longer term usage patterns for the user may be effectively and automatically captured and executed by the user-personalized wake policy, as described with respect to method 200.

Referring now to FIG. 3, a block diagram of selected elements of an embodiment of method 204 for implementing a user-personalized wake policy is depicted in flowchart form. Method 204 may represent a particular embodiment of operation 204 (see FIG. 2, method 200). It is noted that certain operations described in method 204 may be optional or may be rearranged in different embodiments. In the example embodiment of method 204 presented in FIG. 3, wake times are shown being calculated for a period of one week for descriptive clarity. It will be understood that, in various embodiments, the operations depicted in method 204 may be used to calculate wake times for the user-personalized wake policy over a plurality of weeks, as desired.

Method 204 may be initiated from operation 202 in method 200 (see FIG. 2). A global sleep time (R1) and a daily sleep time (R2) may be input (operation 302). The parameters R1 and R2 may represent default parameters or may represent user-specified parameters that a user can adjust to modify performance of the user-personalized wake policy, as desired. Then, a decision may be made whether an observed dormant power state duration is greater (operation 304) than the global sleep time (R1). When the result of operation 304 is NO, method 204 may return to operation 202. When the result of operation 304 is YES, the observed dormant power state duration may be matched (operation 306) with observed value pairs for day of week and time of day. It is noted that the observed dormant power state duration may be a singly observed value, or may be a statistical value indicative of a plurality of observations (measurements). The observed value pairs for day of week and time of day may be included in the first usage parameters. Then, a next day of week may be selected (operation 308). A time gap between time of day values for the next day of week may be calculated (operation 310). Then, a decision may be made whether the time gap is less (operation 312) than the daily sleep time (R2). When the result of operation 312 is NO, method 204 may loop back to operation 310. When the result of operation 312 is YES, a suitable time of day may be selected (operation 314) and a wake time may be calculated (operation 314) to add to the user-personalized wake times. Then a decision may be made whether all days of the week are complete (operation 316). When the result of operation 316 is YES, method 204 may proceed to operation 206 (see FIG. 2). When the result of operation 316 is NO, method 204 may loop back to operation 308.

One example of user-personalized wake times (in 24 hour format) for the user-personalized wake policy described herein is shown below in Table 1.

TABLE 1

Example of User-Personalized Wake Times

| Month | Day of Week | Time of Day |
| --- | --- | --- |
| February | Sunday | 13:30 |
|  |  | 21:00 |
|  | Monday | 6:30 |
|  |  | 8:45 |
|  |  | 12:50 |
|  |  | 21:30 |
|  | Tuesday | 6:40 |
|  |  | 8:45 |

Methods and systems for implementing a user-personalized wake policy may enable learning of actual user behavior over daily, weekly, and/or monthly time scales. Based on actual usage patterns of a user of an information handling system, the user-personalized wake policy may automatically wake the information handling system in advance of when the user is predicted to desire to use the information handling system. Other actions, such as network data updates, may be automatically performed by the user-personalized wake policy in advance of the user-personalized wake times.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method, comprising:
  recording, for a user during a first duration, first usage parameters indicating first periods of usage activity and second periods of inactivity associated with an information handling system, the first usage parameters including data specifying usage start times and usage stop times;

based at least in part on the first usage parameters for the user recorded during the first duration, generating a wake policy for the information handling system, the wake policy including data specifying a plurality of user-personalized wake times for waking the information handling system from a dormant power state, wherein generating the wake policy includes, for each user-personalized wake time, specifying a respective time of day at which to wake the information handling system from a dormant power state;

during a second duration subsequent to the first duration, executing the wake policy, including waking the information handling system from a dormant power state at the user-personalized wake times, wherein the dormant power state includes a sleep mode or a power off state; and during the execution of the wake policy:
   recording, for the first user during the second duration, second usage parameters indicating actual wake times at wake events of the information handling system, the second usage parameters including data specifying, for each wake event, a respective time of day at which the wake event occurred;
   comparing the wake policy to the second usage parameters to determine a frequency of wake events that occurred as a result of the executing of the wake policy; and
   when the frequency of wake events that occurred as a result of the executing of the wake policy is below a first threshold, repeating the recording of the first usage parameters.

2. The method of claim 1, wherein the first duration is at least three weeks long, and wherein the recording of the second usage parameters is repeated at least monthly.

3. The method of claim 1, wherein, for an initial time respectively associated with the first periods of usage activity, the first usage parameters include:
   a time of day;
   a day of week; and
   a month of year,
and wherein, for the second periods of inactivity, the first usage parameters respectively include:
   a dormant power state duration indicating a duration that the information handling system was in the dormant power state.

4. The method of claim 1, wherein generating the wake policy further includes specifying, for each of the user-personalized wake times:
   a day of week; and
   a month of year.

5. The method of claim 1, wherein the generating the wake policy is further based on tuning parameters specified by the user, the tuning parameters including:
   a global sleep time representing a minimum value for a dormant power state duration of the information handling system; and
   a daily sleep time representing a maximum daily value for a dormant power state duration of the information handling system.

6. An article of manufacture comprising a non-transitory computer-readable medium storing instructions, that, when executed by a processor, cause the processor to:
   record, for a user during a first duration, first usage parameters indicating first periods of usage activity and second periods of inactivity associated with an information handling system, the first usage parameters including data specifying usage start times and usage stop times;

based at least in part on the first usage parameters for the user recorded during the first duration, generate a wake policy for the information handling system, the wake policy including data specifying a plurality of user-personalized wake times for waking the information handling system from a dormant power state, wherein generating the wake policy includes, for each user-personalized wake time, specifying a respective time of day at which to wake the information handling system from a dormant power state;

execute, during a second duration subsequent to the first duration, the wake policy, including waking the information handling system from a dormant power state at the user-personalized wake times, wherein the dormant power state includes a sleep mode or a power off state; and during the execution of the wake policy, to:
   record, for the first user during the second duration, second usage parameters indicating actual wake times at wake events of the information handling system, the second usage parameters including data specifying, for each wake event, a respective time of day at which the wake event occurred;
   compare the wake policy to the second usage parameters to determine a frequency of wake events that occurred as a result of the executing of the wake policy; and
   when the frequency of wake events that occurred as a result of the executing of the wake policy is below a first threshold, repeat the recording of the first usage parameters.

7. The article of manufacture of claim 6, wherein the first duration is at least three weeks long, and wherein the instructions to record the second usage parameters are repeated at least monthly.

8. The article of manufacture of claim 6, wherein, for an initial time respectively associated with the first periods of usage activity, the first usage parameters include:
   a time of day;
   a day of week; and
   a month of year,
and wherein, for the second periods of inactivity, the first usage parameters respectively include:
   a dormant power state duration indicating a duration that the information handling system was in the dormant power state.

9. The article of manufacture of claim 6, wherein the instructions to generate the wake policy further includes instructions to specify, for each of the user-personalized wake times:
   a day of week; and
   a month of year.

10. The article of manufacture of claim 6, wherein the instructions to generate the wake policy are further based on tuning parameters, the tuning parameters including:
   a global sleep time representing a minimum value for a dormant power state duration of the information handling system; and
   a daily sleep time representing a maximum daily value for a dormant power state duration of the information handling system.

11. The article of manufacture of claim 10, wherein the tuning parameters are specified by the user.

12. An information handling system, comprising:
a processor subsystem having access to a memory, wherein the memory stores instructions that, when executed by the processor subsystem, cause the processor subsystem to:
record, for a user during a first duration, first usage parameters indicating first periods of usage activity and second periods of inactivity associated with the information handling system, the first usage parameters including data specifying usage start times and usage stop times;
based at least in part on the first usage parameters for the user recorded during the first duration, generate a wake policy for the information handling system, the wake policy including data specifying a plurality of user-personalized wake times for waking the information handling system from a dormant power state, wherein generating the wake policy includes, for each user-personalized wake time, specifying a respective time of day at which to wake the information handling system from a dormant power state;
execute, during a second duration subsequent to the first duration, the wake policy, including waking the information handling system from a dormant power state at the user-personalized wake times, wherein the dormant power state includes a sleep mode or a power off state; and
during the execution of the wake policy, to:
record, for the first user during the second duration, second usage parameters indicating actual wake times at wake events of the information handling system, the second usage parameters including data specifying, for each wake event, a respective time of day at which the wake event occurred;
compare the wake policy to the second usage parameters to determine a frequency of wake events that occurred as a result of the executing of the wake policy; and when the frequency of wake events that occurred as a result of the executing of the wake policy is below a first threshold, repeat the recording of the first usage parameters.

13. The information handling system of claim 12, wherein the first duration is at least three weeks long, and wherein the instructions to record the second usage parameters are repeated at least monthly.

14. The information handling system of claim 12, wherein, for an initial time respectively associated with the first periods of usage activity, the first usage parameters include:
a time of day;
a day of week; and
a month of year,
and wherein, for the second periods of inactivity, the first usage parameters respectively include:
a dormant power state duration indicating a duration that the information handling system was in the dormant power state.

15. The information handling system of claim 12, wherein the instructions to generate the wake policy further includes instructions to specify, for each of the user-personalized wake times:
a day of week; and
a month of year.

16. The information handling system of claim 12, wherein the instructions to generate the wake policy are further based on tuning parameters, the tuning parameters including:
a global sleep time representing a minimum value for a dormant power state duration of the information handling system; and
a daily sleep time representing a maximum daily value for a dormant power state duration of the information handling system.

17. The information handling system of claim 16, wherein the tuning parameters are specified by the user.

* * * * *